US009352973B2

(12) United States Patent  
Ungar et al.

(10) Patent No.: US 9,352,973 B2  
(45) Date of Patent: May 31, 2016

(54) APPARATUS AND PROCESS FOR THE SYNTHESIS OF AMMONIA

(76) Inventors: Gert Ungar, Frankfurt am Main (DE); Jürg Dieter Ungar, Frankfurt am Main (DE)

(*) Notice: Subject to any disclaimer, the term of this patent is extended or adjusted under 35 U.S.C. 154(b) by 0 days.

(21) Appl. No.: 13/142,273

(22) PCT Filed: Jan. 29, 2009

(86) PCT No.: PCT/DE2009/000111  
§ 371 (c)(1),  
(2), (4) Date: Jun. 24, 2011

(87) PCT Pub. No.: WO2010/085926  
PCT Pub. Date: Aug. 5, 2010

(65) Prior Publication Data  
US 2011/0293502 A1 Dec. 1, 2011

(51) Int. Cl.  
*B01J 8/04* (2006.01)  
*C01C 1/04* (2006.01)

(52) U.S. Cl.  
CPC ............ *C01C 1/0417* (2013.01); *B01J 8/0453* (2013.01); *B01J 8/0469* (2013.01); *B01J 8/0496* (2013.01); *C01C 1/0405* (2013.01); *C01C 1/0411* (2013.01); *C01C 1/0482* (2013.01); *B01J 2208/0053* (2013.01); *B01J 2208/00061* (2013.01); *B01J 2208/00132* (2013.01);

(Continued)

(58) Field of Classification Search  
None  
See application file for complete search history.

(56) References Cited

U.S. PATENT DOCUMENTS

| 1,099,530 | A | * | 6/1914 | Wolff | 422/646 |
| 1,704,214 | A | * | 3/1929 | Richardson | 423/360 |
| 2,224,014 | A | * | 12/1940 | Dunham et al. | 208/146 |

(Continued)

FOREIGN PATENT DOCUMENTS

| DE | 603 04 257 T2 | 8/2006 |
| EP | 1 385 785 A2 | 2/2004 |

(Continued)

OTHER PUBLICATIONS

International Search Report, PCT/DE2009/000111, Oct. 28, 2009, 2 pgs.

*Primary Examiner* — Jennifer A Leung  
(74) *Attorney, Agent, or Firm* — Paul D. Strain, Esq.; Strain & Strain PLLC (57) ABSTRACT

Described herein is an apparatus for the synthesis of ammonia from a synthesis gas containing $N_2$ and $H_2$, comprising at least one first reactor. The apparatus comprises a first non-cooled catalyst bed unit, at least one heat exchanger apparatus, and at least two cooled catalyst bed units. Each cooled catalyst bed unit is equipped with a plurality of cooling pipes. The apparatus further comprises a circuit line having at least one feed apparatus and at least one outlet apparatus, wherein the circuit line, starting from the feed apparatus, comprises in consecutive downstream arrangement the plurality of cooling pipes, the first non-cooled catalyst bed unit, the at least one heat exchanger apparatus, and the at least two cooled catalyst bed units up to the outlet apparatus. To this end, the circuit line comprises at least one bypass line, which is arranged between the feed apparatus and the first non-cooled catalyst bed unit in parallel to the plurality of cooling pipes running through the at least two cooled catalyst bed units. The invention further provides a method for the synthesis of ammonia from a synthesis gas containing $N_2$ and $H_2$.

28 Claims, 5 Drawing Sheets

(52) U.S. Cl.
CPC .................. *B01J2208/00194* (2013.01); *B01J 2208/00371* (2013.01); *B01J 2219/0004* (2013.01)

(56) References Cited

U.S. PATENT DOCUMENTS

6,003,594 A * 12/1999 Cameron et al. .............. 165/297
6,479,027 B1 * 11/2002 Jacobsen ....................... 423/362
7,025,944 B2    4/2006 Nielsen et al.
7,172,743 B2    2/2007 Ungar et al.

FOREIGN PATENT DOCUMENTS

| EP | 1 661 860 A1 | 5/2006 |
| GB | 1096313 | 12/1967 |
| WO | WO 02/079088 A2 | 10/2002 |
| WO | WO 2008031488 A1 * | 3/2008 |
| WO | WO 2010085926 A1 * | 8/2010 |

* cited by examiner

APPARATUS AND PROCESS FOR THE SYNTHESIS OF AMMONIA

CROSS-REFERENCE TO RELATED PATENT APPLICATIONS

This application is a National Stage of International Application No. PCT/DE2009/000111, filed Jan. 29, 2009, the entire contents of which are incorporated herein by reference in their entirety.

The invention relates to a process and an apparatus for the synthesis of ammonia from a nitrogen- and hydrogen-containing synthesis gas.

PRIOR ART

The synthesis of ammonia according to the Haber-Bosch process from nitrogen and hydrogen usually takes place on mixed iron oxide catalysts at approximately 150 to 300 bar pressure and a temperature in the range from 350 to 530° C. The annual production of ammonia is at present approximately 125 million tons, the manufacture of which makes up approximately 3% of global energy consumption. The ammonia exit concentration under industrial reaction conditions is often only 13 to 20%. Theoretically, the equilibrium concentration according to Nielsen is 38.82% for reaction conditions at 200 atm and 400° C. and inert gas-free synthesis gas. If the reaction temperature can be lowered by use of an active catalyst, the equilibrium concentration and therewith also a theoretically achievable concentration thus increase.

EP 13 857 85 describes a process for the manufacture of ammonia on a granular catalyst, where unreacted synthesis gas consisting of nitrogen and hydrogen is led through a first uncooled catalyst bed and subsequently, as partially reacted synthesis gas, through a heat exchanger. Thereupon, the partially reacted synthesis gas is led through at least two further cooled catalyst beds. The cooling takes place here by unreacted synthesis gas being led through cooling pipes that are arranged in the cooled catalyst beds before being fed into the first uncooled catalyst bed. Here, the unreacted synthesis gas is allowed to flow first through the cooling pipes of the last catalyst bed and subsequently through the next to last. Using this process, at a pressure of 150 bar an ammonia concentration in the product gas of 29.5% by volume can be achieved, by providing a temperature profile in the cooled catalyst beds which is similar to the optimal temperature curve.

In DE 603 04 257 T2, a process for the synthesis of ammonia is disclosed, where the synthesis gas is brought into contact with one or more catalysts, of which at least one with ruthenium applied to a nitride is applied to a secondary substrate. This process is suitable for plants with large capacities and high pressures and lowers the specific energy consumption.

DISCLOSURE

Starting from this prior art, the present invention is based on the object of providing an improved apparatus and an improved process for the synthesis of ammonia. This object is achieved by an apparatus having the inventive features. Refinements are set out in the subclaims.

According to a first embodiment, the apparatus according to the invention for the synthesis of ammonia from a synthesis gas containing nitrogen ($N_2$) and hydrogen ($H_2$) comprises a reactor that contains a first uncooled catalyst bed unit and at least one heat exchanger apparatus. In the two cooled catalyst bed units are furthermore contained. The cooling surface is created by a number of cooling pipes; it is subsequently also designated as a "cooling unit". The cooled catalyst bed units are equipped with these cooling units. Starting from one or more feed apparatuses for synthesis gas, a circuit line proceeds firstly into these cooling units and further to the first uncooled catalyst bed and subsequently to the heat exchanger apparatus. From there, the circuit line extends through the at least two cooled catalyst bed units to the outlet apparatus or the outlet apparatuses, if a number are provided, in which ammonia ($NH_3$) is separated from the product gas by condensation.

Unreacted nitrogen and hydrogen from the product gas are led back into the circuit line and fresh nitrogen and hydrogen are admixed to the synthesis gas. In order to control the cooling capacity of the cooling units, or the plurality of cooling pipes in the cooled catalyst bed units, according to the invention at least one bypass line is arranged in parallel to the cooling units, which branches off from the circuit line after the feed apparatus and is combined again with the circuit line before the first uncooled catalyst bed unit.

Furthermore, it is provided in one embodiment that the cooling pipes, which in each case provide a cooling unit with a cooling surface for a cooled catalyst bed unit, in each case have on the outlet ends of the cooling pipes an exit collection apparatus, in which the synthesis gas is collected and is led on to the next cooling unit or to the first uncooled catalyst bed unit. Each of these exit collection apparatuses can in each case be connected to a bypass line. It is thus advantageously possible, depending on catalyst type and activity, to adjust the temperature profile of each cooled catalyst bed unit optimally for the ammonia synthesis by it being possible to vary the cooling capacity of the cooling units by means of a bypass control. The conventional plants for the synthesis of ammonia are in each case laid out only for a catalyst having defined activity: It is not possible to employ a catalyst with higher activity, as the cooling capacity necessary for this cannot be achieved with the existing cooling surface. If, however, the activity of the catalyst falls over the run time, the cooling capacity is too high and the catalyst bed is too strongly cooled. This can be prevented by the use of the bypass lines, which allow a variation of the cooling capacity by a part of the synthesis gas functioning as a cooling medium not being led through the plurality of cooling pipes, but through the bypass line.

A control device serves for the distribution of the synthesis gas from the feed apparatus between the bypass lines and the plurality of cooling pipes by a distributor device controlling the synthesis gas feed. The control device is advantageously coupled here with a sensor for the recording of a process parameter, such that the distributor device is regulated as a function of the process parameter. If this parameter is the exit temperature of the cooled catalyst bed units, it is advantageously possible to adjust the temperature profile of each cooled catalyst bed unit to the optimal temperature profile for ammonia synthesis. This makes possible an efficient utilization of the catalyst capacities, whereby in the final analysis energy can be saved.

In an advantageous embodiment of the apparatus according to the invention, a fluid path for the synthesis gas is provided by the circuit line which, starting from the feed apparatus, extends first through the plurality of cooling pipes of the last cooled catalyst bed unit situated downstream and then through the plurality of cooling pipes of the in each case next catalyst bed unit situated upstream.

It is furthermore provided that the first uncooled catalyst bed unit can be a first uncooled catalyst bed arranged in the first reactor. Alternatively to this, the first uncooled catalyst bed unit can be arranged in a further reactor that comprises at least a first uncooled catalyst bed. This can be a conventional, existing reactor that has a number of uncooled catalyst beds, between which indirect cooling can be arranged. With such a conventional reactor, only ammonia exit concentrations of about 20% by volume can be achieved. In order to increase the yield, according to the invention the at least two cooled catalyst bed units, which are arranged in the "first" reactor, can be connected downstream of this existing reactor ("second reactor"), which forms the first uncooled catalyst bed unit.

Furthermore, in one embodiment it is provided that the at least one heat exchanger apparatus is either a first of the cooled catalyst bed units, which thus simultaneously serves as a heat exchanger and reaction site, or is a heat exchanger that can be arranged inside or outside of the first reactor. It is also conceivable that a further reactor is provided as a heat exchanger apparatus which, in the case where the first uncooled catalyst bed unit is a catalyst bed arranged in the first reactor, represents a second reactor of the apparatus. In the case where, as explained above, the uncooled catalyst bed unit is arranged in a second reactor, the heat exchanger reactor forms a third reactor. Here, this additional reactor can be a cooled tubular reactor filled with catalyst.

In a further embodiment of the apparatus according to the invention, at least the last cooled catalyst bed unit seen downstream in the circuit line comprises a catalyst with an activity that is at least twice, preferably five-fold and very preferably more than seven-fold, the activity of a conventional iron catalyst. Such a catalyst can be a barium-activated ruthenium catalyst.

The number of cooled catalyst bed units is two or more cooled catalyst bed units and can be fixed by the person skilled in the art during the design of the synthesis apparatus. In particular, the number of cooled catalyst bed units can be up to four, but three cooled catalyst bed units are preferred.

A further embodiment of the invention relates to a process for the synthesis of ammonia from a synthesis gas containing nitrogen and hydrogen in the apparatus according to the invention, which has at least one reactor with cooled catalyst beds. Here, the supplying of nitrogen and hydrogen as synthesis gas first takes place by the feed apparatus to the circuit line. The synthesis gas is led through the cooling units, or through the plurality of cooling pipes of the cooled catalyst bed units, the temperature of the synthesis gas increasing. The warmed synthesis gas is led into the uncooled catalyst bed unit, where it reacts partially to give ammonia, such that a partially reacted synthesis gas results that contains ammonia in a first exit concentration. This first exit concentration can correspond to a proportion by volume of 5 to 25%. The partially reacted synthesis gas, the temperature of which has risen further, is then allowed to cool in the at least one heat exchanger apparatus. The partially reacted synthesis gas is now led into the cooled catalyst bed units, where nitrogen and hydrogen react further to give ammonia and a product gas is thereby formed that contains ammonia in a second exit concentration. This product gas exit concentration can reach over 30% by volume at 100 bar when using a highly active catalyst such as the ruthenium catalyst. In order to reach an ammonia exit concentration of in particular up to 40% by volume, a pressure increase can be necessary.

Finally, the discharge of the product gas by the outlet apparatus takes place in order to separate ammonia. Unreacted nitrogen and hydrogen from the product gas are led back ahead of the feed apparatus, mixed with non-recycled fresh nitrogen and hydrogen and made available as synthesis gas in the circuit line.

For regulation of the temperature course in the cooled catalyst bed units, a fraction of the synthesis gas can be led through the at least one bypass line in parallel to a residual fraction of the synthesis gas through the cooling units. A distributor device controlled by at least one control device serves for the distribution of the synthesis gas stream into the bypass line and the cooling units. Advantageously, the control device is designed as a regulating device that records by means of a functionally coupled sensor at least one parameter of the process, which is preferably in each case a temperature of the cooled catalyst bed units. The control device thus regulates the fraction of the synthesis gas that is led into the bypass lines. It is thereby possible to adjust the temperature profile in the cooled catalyst beds in each case to the temperature profile that is optimized for ammonia synthesis for the respective pressure and the catalyst used. Moreover, the cooling capacity during the run time of the catalyst can be adjusted to its declining activity, such that with falling activity of the catalyst the cooling capacity can also be lowered by the cooling units, with respect to the fraction of the synthesis gas, in order that the reaction rate is not too strongly decreased or the reaction even comes completely to a halt.

Moreover, it is conceivable with a novel design of a reactor to oversize the cooling surfaces of the cooled catalyst bed units such that it is possible in this reactor to employ a catalyst in future that has an even much higher activity. For the catalysts available at present, the cooling capacity can be adjusted by means of the bypass lines such that the optimal temperature profile is formed for the respective catalyst. This contributes to an optimization of the ammonia manufacturing process, such that under certain circumstances a higher yield can be achieved with a smaller amount of catalyst. At the same time, the daily production of ammonia can be increased if sufficient synthesis gas can be produced.

The process according to the invention can be carried out in a pressure range between 30 and 300 bar, and a temperature range between 100 and 600° C. The pressure range is preferably between 100 and 250 bar. The temperature of the synthesis gas before introduction into the first uncooled catalyst bed unit should be between 150 and 500° C.

In one embodiment of the process according to the invention, the synthesis gas is led through the cooling units in co-current flow with the partially reacted synthesis gas in the catalyst bed units. Alternatively, the synthesis gas in the cooling units can be led in countercurrent flow to the partially reacted synthesis gas in the cooled catalyst bed units. Particularly advantageously, in one embodiment the synthesis gas can be led through the cooling units in a combination of co- and countercurrent flow to the partially reacted synthesis gas in the cooled catalyst bed units, it being particularly preferred to conduct the synthesis gas through the cooling unit of the first catalyst bed unit in countercurrent flow to the partially reacted synthesis gas through the first catalyst bed unit, while the synthesis gas is led through the cooling units of the other catalyst bed units in co-current flow with the partially reacted synthesis gas through these catalyst bed units.

Here, in one embodiment of the process the synthesis gas can be led firstly through the cooling unit of the last cooled catalyst bed unit situated downstream, and thereupon in each case through the cooling units of the in each case next catalyst bed unit situated upstream.

Furthermore, an advantageous embodiment consists in that by leading the partially reacted synthesis gas into a heat exchanger apparatus and allowing it to cool there, high-pressure steam with a pressure of 50 to 140 bar is generated.

Finally, the process according to the invention provides that at least in the last cooled catalyst bed unit situated downstream the reaction of the partially reacted synthesis gas takes place on a catalyst whose activity is at least double, preferably five-fold and very preferably more than seven-fold, the activity of a conventional iron catalyst. Such a highly active catalyst can be, for example, a barium-activated ruthenium catalyst.

BRIEF DESCRIPTION OF THE FIGURES

Further exemplary embodiments, and some of the advantages that are connected with this and further exemplary embodiments become clear and better understandable by means of the subsequent detailed description. Reference to the figures in the description is also supportive here. Objects or parts thereof that are essentially identical or very similar can be provided with the same reference symbols.

The process according to the invention for the synthesis of ammonia from a synthesis gas containing nitrogen $N_2$ and hydrogen $H_2$ can be carried out in an apparatus that consists of at least one first reactor. Here, the apparatus comprises a first uncooled catalyst bed unit, at least one heat exchanger apparatus and at least two cooled catalyst bed units. The cooling of a catalyst bed unit takes place using a plurality of cooling pipes, which in each case is arranged in a catalyst bed unit, and is subsequently also designated as a "cooling unit". The synthesis gas is fed into a circuit line starting from a feed apparatus, and firstly flows through the cooling units assigned to the cooled catalyst bed units, whereby the synthesis gas absorbs heat. The warmed synthesis gas then flows through the first uncooled catalyst bed unit, in which a partial reaction of nitrogen and hydrogen to give ammonia takes place. The now partially reacted synthesis gas with a first exit concentration has a markedly raised temperature and is led through a heat exchanger apparatus in order to cool the partially reacted synthesis gas. From here, the partially reacted synthesis gas reaches the cooled catalyst bed units, in which the further reaction of nitrogen and hydrogen to give ammonia proceeds up to a second ammonia exit concentration. The product gas resulting thereby is led to an outlet apparatus, where ammonia condenses out of the product gas and is drawn off, while unreacted nitrogen and hydrogen together with fresh nitrogen and hydrogen are fed into the circuit line by the feed apparatus as synthesis gas.

In order to now optimize the temperature profile in the respective cooled catalyst beds for the ammonia synthesis, the circuit line has at least one bypass line, which is arranged between the feed apparatus and the first uncooled catalyst bed unit in parallel to the cooling units running through the at least two cooled catalyst bed units. Here, a number of bypass lines can be provided, such that in each case one bypass line opens into an exit collection apparatus of a cooling unit of an uncooled catalyst bed, or that the bypass line runs directly from the feed apparatus to the first uncooled catalyst bed unit. The fraction of the synthesis gas that is led through the bypass line, or the fractions of the synthesis gas that are led through the bypass lines is/are fixed by a control device which is connected functionally with a distributor device for the bypass line and the plurality of cooling pipes. Here, the control device can be a regulated control device, which regulates the fraction of the synthesis gas that is led into the bypass line as a function of a determined process parameter. The process parameter is measured by means of a sensor that is functionally coupled to the regulated control device. This process parameter can be the temperature of the respective cooled catalyst beds, such that their temperature is optimized by adjustment of the cooling capacity, which depends on what fraction of the synthesis gas flows through the cooling units and what is led through the bypass lines.

From the plurality of cooling pipes and the bypass line, the synthesis gas is led into the uncooled catalyst bed unit, which can be an uncooled catalyst bed in the first reactor; alternatively, it is possible that an existing reactor that comprises at least one first uncooled catalyst bed is considered as an uncooled catalyst bed unit. In order to cool the partially reacted synthesis gas after exit from the uncooled catalyst bed unit, it is led into a heat exchanger apparatus, which can be a first of the at least two cooled catalyst bed units, where a further reaction simultaneously takes place. Alternatively, the heat exchanger apparatus can also be a further reactor, which is preferably a cooled tubular reactor filled with catalyst, by cooling the partially reacted synthesis gas and allowing it to react further. A heat exchanger apparatus without reaction is of course also conceivable, where such a heat exchanger can be comprised in the first reactor or arranged outside the first reactor.

The cooled, partially reacted synthesis gas is now led to the cooled catalyst bed units, the number of which comprises up to four, but preferably three, catalyst bed units. Preferably, at least the last cooled catalyst bed arranged downstream can have a catalyst, the activity of which is at least twice, preferably five-fold and very preferably more than seven-fold, the activity of a conventional iron catalyst. Such a highly active catalyst is, for example, a barium-activated ruthenium catalyst. After the reaction in the at least two cooled catalyst bed units, a product gas that contains ammonia in a second exit concentration leaves the reactor, is led to the outlet apparatus, where the separation of the ammonia takes place.

A further optimization of the temperature in the cooled catalyst bed units can be carried out by a combination of co- and countercurrent conduct of the synthesis gas through the cooling units and of the partially reacted synthesis gas in the cooled catalyst bed units. In particular, it is useful at higher pressures to carry out the cooling in countercurrent flow in the first cooled catalyst bed, as the reaction rate there is still so high that on cooling in co-current flow it is not possible to bring the temperature of the reacting gas close to the optimal temperature curve. The following catalyst beds are cooled in co-current flow such that here too an optimal temperature profile can be achieved and the temperature at the end of the respective cooled catalyst bed units does not fall so greatly that the reaction would come to a stop. It has also turned out to be advantageous that the synthesis gas is first led as a cooling gas through the plurality of cooling pipes of the last cooled catalyst unit seen downstream and then in each case flows through the next catalyst bed unit situated upstream.

With this apparatus and the process according to the invention, the first ammonia exit concentration of the partially reacted synthesis gas after the first uncooled catalyst bed corresponds here to a proportion by volume of 5 to 25%, whereas the second ammonia exit concentration of the product gas on leaving the last cooled catalyst bed results in a proportion by volume of more than 30%, in particular up to 40%.

Figure 1:
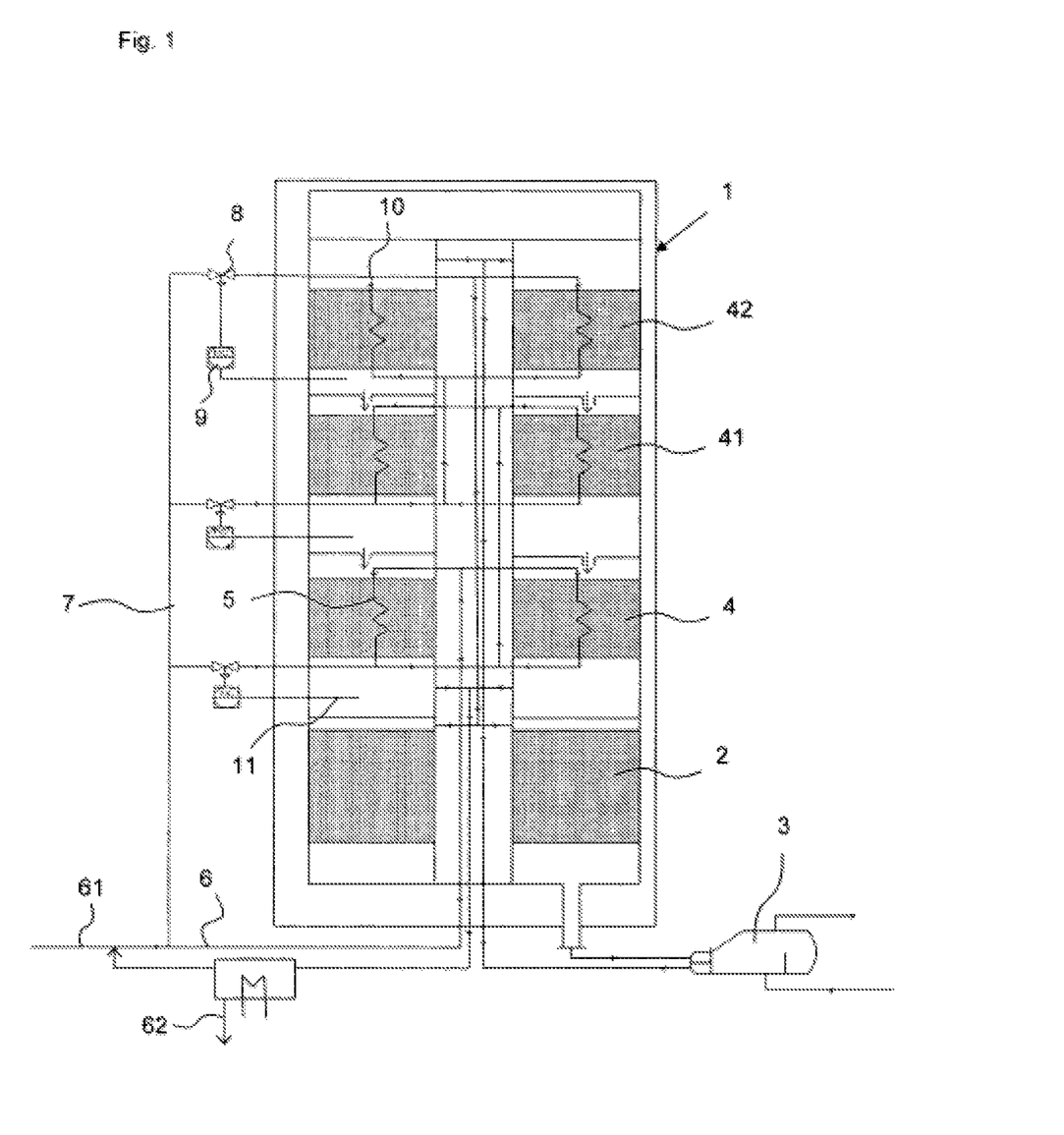
FIG. 1 shows a schematic view of an apparatus according to the invention for the synthesis of ammonia in a reactor with three cooled and one uncooled catalyst bed.

FIG. 1 shows the apparatus according to the invention in which the process for the synthesis of ammonia is carried out from nitrogen and hydrogen. A feed apparatus feeds the circuit line 6 with synthesis gas containing nitrogen and hydrogen. Generally, an external heat exchanger not shown in FIG. 1 can be arranged in the circuit line 6 after the feed apparatus 61 and the return apparatus of non-reacted synthesis gas, which pre-warms the circuit gas including the fresh synthesis gas. This external heat exchanger normally has a bypass line assigned to it (likewise not shown), which is used in order to adjust the entry temperature of the synthesis gas in the reactor 1 such that the desired temperature can be achieved on entry into the first uncooled bed 2.

The circuit line 6 enters the reactor 1 and leads first in co-current flow through the cooling pipes 5 of the last cooled catalyst bed 4. An exit apparatus 10 of the cooling pipes 5 can be designed as an exit collector or as an exit chamber, into which a first bypass line 7 also opens. The fraction of synthesis gas that is not led through the cooling pipes 5 of the last catalyst bed 4 is controlled by means of the distributor device 8, which is connected to a sensor 11 that records the exit temperature of the product gas from the cooled catalyst bed 4. The unreacted synthesis gas from the cooling pipes 5, or the bypass line 7, is led into the cooling pipes 5 of the next catalyst bed 41 situated upstream and conducted in co-current flow. Into the exit apparatus 10 of the cooling pipes 5 of the second catalyst bed 41, a second bypass line 7 likewise opens, where here too, the fraction of the synthesis gas in the bypass line 7 or the cooling pipes 5 takes place in a temperature-controlled manner. From the exit apparatus 10 for cooling pipes 5 and bypass line 7 of the second catalyst bed 41, the synthesis gas is led to the cooling pipes 5 of the first cooled catalyst bed 42 and there conducted in countercurrent flow. At an exit apparatus 10, here too the fraction of the synthesis gas from cooling pipes 5 of the first cooled catalyst bed 42 and bypass line 7 can be regulated as a function of the temperature recorded by the sensor 11 by means of the control device 9. From the exit apparatus 10 of the cooling pipes 5 of the first cooled catalyst bed unit 42, the unreacted synthesis gas is led to the first uncooled catalyst bed 2. Nitrogen and hydrogen react there to give ammonia up to a first exit concentration. The now partially reacted synthesis gas is conducted from the first uncooled catalyst bed to a heat exchanger apparatus 3, in order to be cooled there with steam generation. From the steam generator 3, the partially reacted synthesis gas is fed to the first cooled catalyst bed 42. After exit from the first cooled catalyst bed 42, the temperature of the partially reacted synthesis gas is recorded by means of the sensor 11 and the fraction of cold synthesis gas is regulated through the bypass line 7 by means of the control unit 9, in order to obtain the optimal exit temperature. The partially reacted synthesis gas next runs through the second cooled catalyst bed unit 41, in which cooling by the cooling pipes 5 now takes place in co-current flow. Here too, the fraction of the synthesis gas functioning as cooling gas is regulated in a temperature-controlled manner. Finally, the partially reacted synthesis gas is led through the last catalyst bed unit 4 likewise cooled in co-current flow, such that a product gas with a second ammonia exit concentration results. From the last cooled catalyst bed unit 4, the product gas is led to the outlet apparatus 62 in order to allow ammonia to condense out and to separate off.

Figure 2:
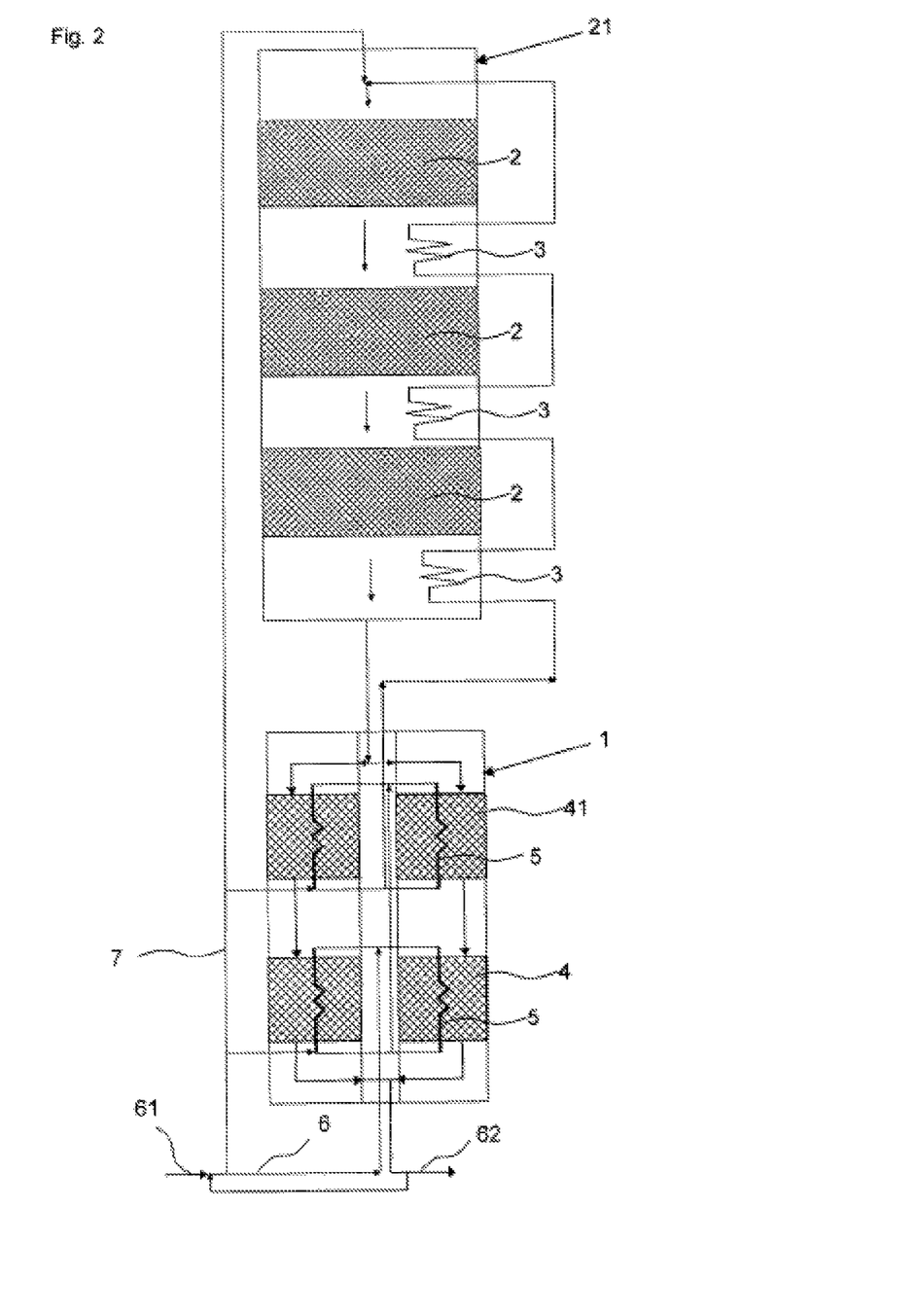
FIG. 2 shows sketchwise an embodiment of the invention with a conventional existing ammonia reactor, to which was connected downstream a "first" reactor according to the invention with two cooled catalyst bed units.

In FIG. 2, it is shown schematically how a reactor 1 with two cooled catalyst beds 4, 41 is connected downstream of an existing reactor 21, which is constructed according to the prior art. The reactor 21 according to the prior art contains three uncooled catalyst beds 2, to which in each case an indirect cooling 3 is connected downstream. Starting from the synthesis gas feed line 61, the bypass lines 7 lead in parallel to the circuit line 6 analogously to FIG. 1 to the exit collectors of the plurality of the cooling pipes 5 of the cooled catalyst beds 4, 41. As shown in FIG. 2, a bypass line 7 can extend to the inlet of the existing reactor 21. The fraction of the synthesis gas that does not flow through the bypass line 7, but takes the path of the circuit line 6, is first led in co-current flow through the cooling pipes 5 of the last cooled catalyst bed 4 of the reactor 1 connected downstream. At the exit collector of the cooling pipes 5, a first synthesis gas fraction from a first bypass line 7 is combined with the synthesis gas fraction from the circuit line 6. This is repeated on passage of the synthesis gas through the plurality of cooling pipes 5 of the first cooled catalyst bed 41, in the exit collector of which opens a bypass line 7. The synthesis gas flows through the plurality of cooling pipes 5 of the first cooled catalyst bed 41 likewise in co-current flow. From there, the synthesis gas is led through the indirect cooling apparatuses 3 of the existing reactor 21, before the warmed synthesis gas—together with the synthesis gas fraction of the third bypass line 7, which leads to the inlet of the existing reactor 21—is led into the three uncooled catalyst beds 2 in order to be reacted there to give the first exit concentration of ammonia. The partially reacted synthesis gas, which leaves the existing reactor 21 with the first exit concentration, enters the reactor 1 connected downstream and flows through the two cooled catalyst beds 41 and 4. The product gas with the second exit concentration of ammonia emerging from the reactor 1 connected downstream is led to an apparatus for the condensation and separation of ammonia (not shown), from which unreacted hydrogen and nitrogen are led back into the circuit line 6.

EXAMPLE 1

A first calculated example relates to a process at a pressure of 200 bar with a synthesis gas entry amount of 26,153 kmol/h. The reactor has an uncooled catalyst bed, an external waste-heat boiler and three cooled catalyst beds. The different operating variants are listed in the following table 1. In this are listed the flow conduct of the cooled catalyst beds, the catalyst type and the presence of bypasses. In addition to the catalyst volume, the daily ammonia production is indicated as a result. The variants 3 to 5 correspond here to a reactor construction as is shown in FIG. 1 with three bypasses and the countercurrent conduct in the first cooled catalyst bed.

From the comparison between variant 1 and 2, in which the first cooled catalyst bed is conducted once in co-current flow and once in countercurrent flow, it is evident that the ammonia production in the case of the cooled first catalyst bed in countercurrent flow slightly increases. With the integration of the bypasses into the reactor construction, the cooling area can be enlarged, such that the catalyst volume decreases, but whereby it is also possible to employ a catalyst that has a higher activity than the conventional iron catalyst. With the bypass arrangement and a fresh iron catalyst, a daily ammonia production is achieved that corresponds approximately to that of variant 1 with the first cooled catalyst bed in co-current flow and without bypasses. If the iron catalyst ages, as shown in variant 4, the production falls markedly. If a catalyst with a markedly higher activity is employed, for example an improved iron catalyst, as in variant 5, a markedly higher daily ammonia production can be achieved.

Figure 3:
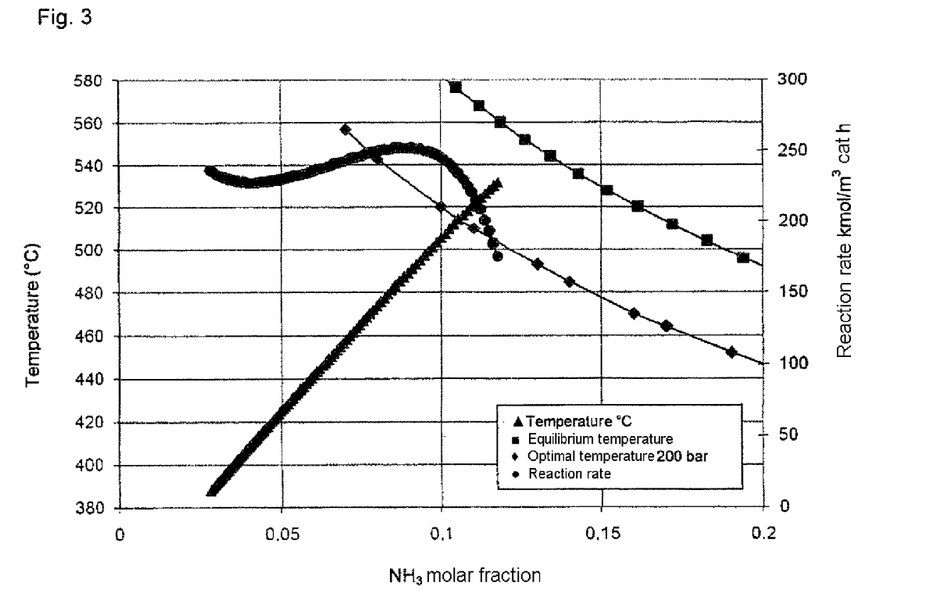
FIG. 3 shows temperature curves and reaction rate in an uncooled catalyst bed in a graph with an operating variant according to the invention (variant 3 from table 1)

FIG. 3 shows the temperature course (▲) and the reaction rate (●) for the uncooled catalyst bed 2 from FIG. 1 according to variant 3 from table 1. The optimal temperature curve (♦) at 200 bar and the equilibrium curve (■) are furthermore shown in FIG. 3. With increasing ammonia concentration, the reaction rate at first falls, as can be seen in the left area of the curve. If the temperature approaches the optimal temperature curve, the reaction rate begins to increase and achieves a maximum at an ammonia molar fraction of approximately 0.09. This maximum of the reaction rate is achieved before the temperature curve intersects the curve of the optimal temperature course (approximately at an ammonia molar fraction of 0.11), as here the influence of the ammonia concentration again predominates and thus the reaction rate again decreases, as can be seen from the right area of the curve. On exceeding the optimal temperature curve and approach to the equilibrium curve, the reaction rate falls steeply.

Figure 4:
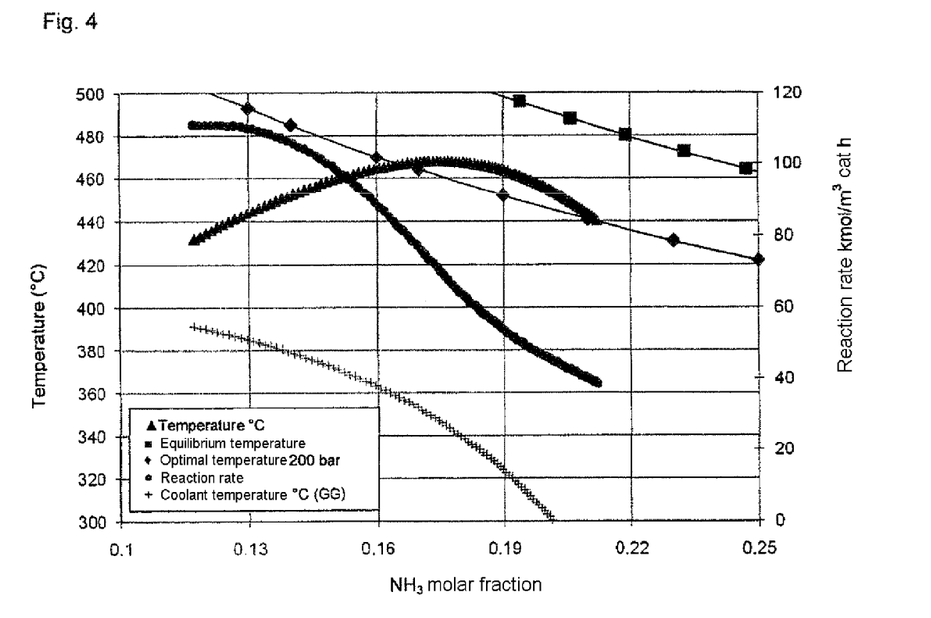
FIG. 4 shows temperature curves and reaction rate in a first cooled catalyst bed in a graph with an operating variant according to the invention (variant 3 from table 1)

The temperature course (▲) and the reaction rate (●) for the first cooled catalyst bed 42 according to variant 3 from table 1 are shown in FIG. 4. In the left area, the reaction rate is at first constant on account of the approach of the temperature (▲) to the optimal temperature curve (♦), but then begins to fall with increasing ammonia concentration. If the temperature exceeds the optimal temperature curve (presently at an ammonia molar fraction of approximately 0.17), the decrease in the reaction rate becomes steeper. A further temperature increase is suppressed by the cooling in countercurrent flow—the course of the coolant temperature (+) is additionally shown in FIG. 4—such that the temperature in the first cooled catalyst bed 42 does not further approach the equilibrium curve (■), but again falls to the optimal temperature curve.

Figure 5:
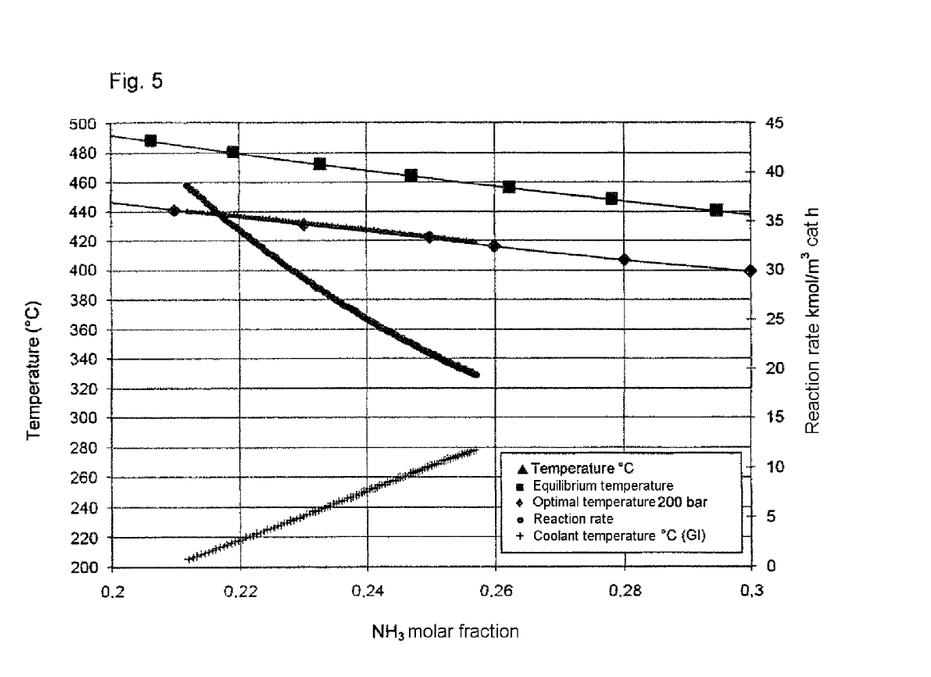
FIG. 5 shows temperature curves and reaction rate in a second cooled catalyst bed in a graph with an operating variant according to the invention (variant 3 from table 1)
Figure 6:
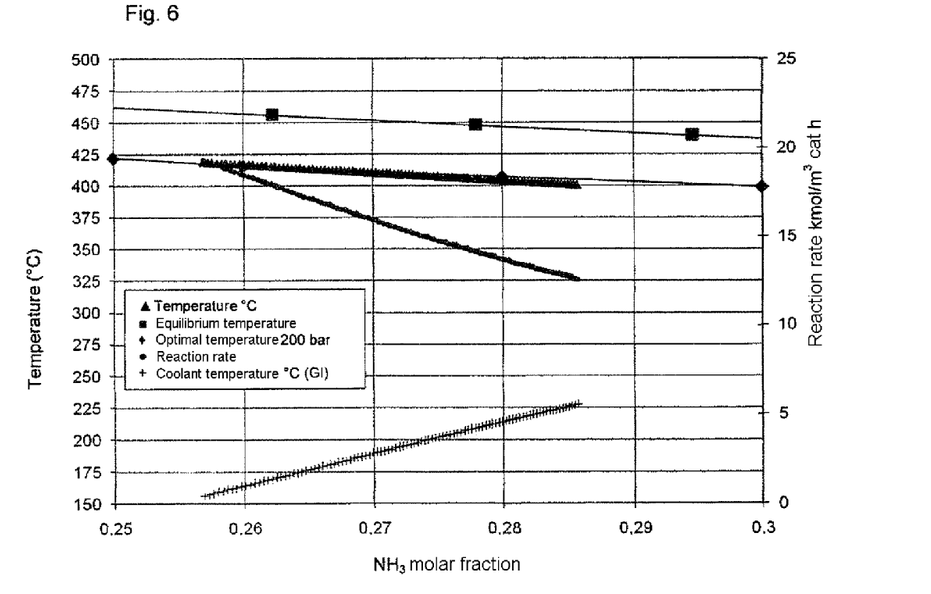
FIG. 6 shows temperature curves and reaction rate in a third cooled catalyst bed in a graph with an operating variant according to the invention (variant 3 from table 1)
Figure 7:
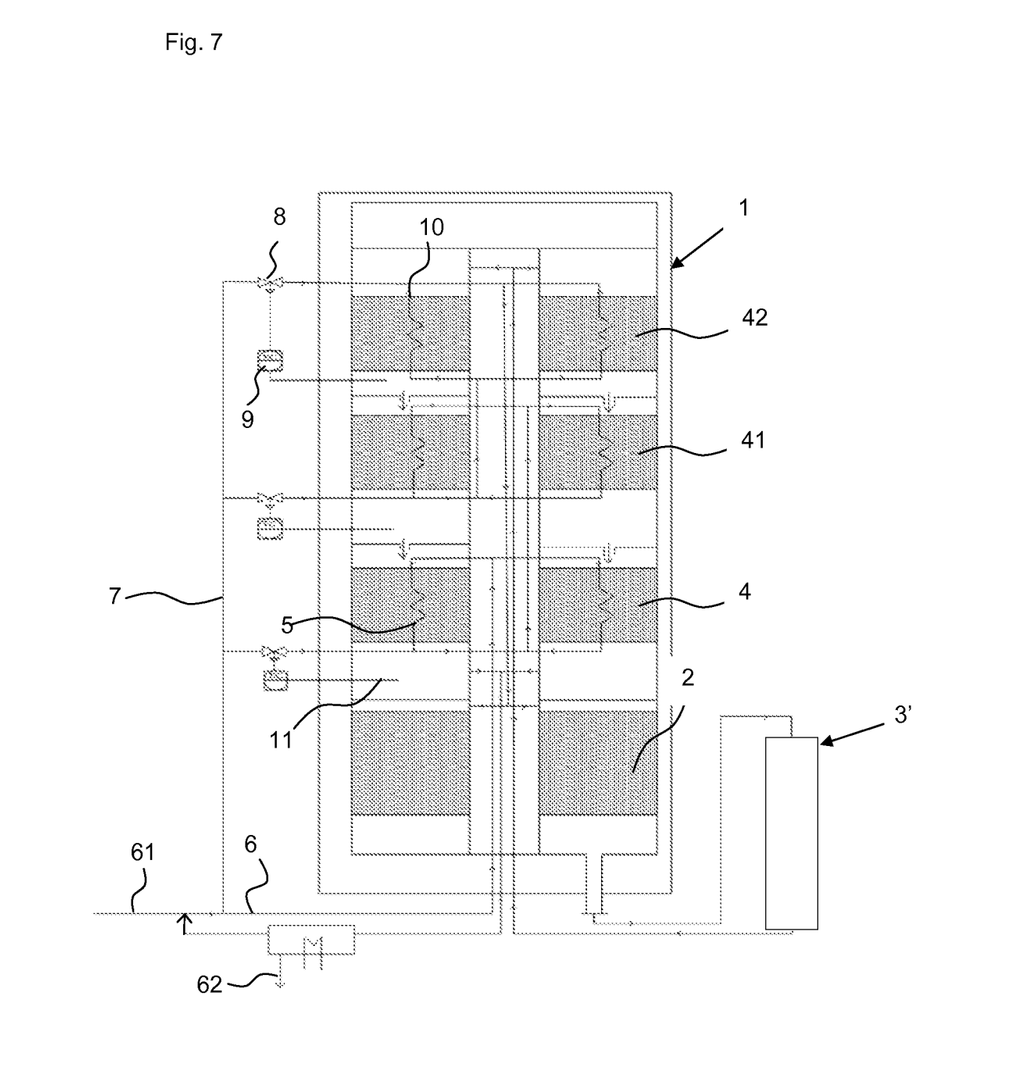
FIG. 7 shows a schematic view of an apparatus according to the invention for the synthesis of ammonia in a reactor with three cooled and one uncooled catalyst bed with a second reactor 3' being a cooled tubular reactor filled with catalyst as heat exchanger.

FIGS. 5 and 6 show the temperature course (▲) and the reaction rate (●) for the second cooled catalyst bed 41 and the last cooled catalyst bed 4 according to variant 3 from table 1. By means of the apparatus or process conduct according to the invention, the advantageous course of the temperature virtually along the optimal temperature curve (♦) is now achieved here, such that no approach of the temperature to the equilibrium curve (■) takes place and the decrease in the reaction rate is based exclusively on the increasing ammonia concentration. The coolant temperature (+) of the second catalyst bed 41 cooled in co-current flow and last catalyst bed 4 is furthermore shown in FIG. 5 and FIG. 6.

Table 2 reproduces the temperature course and amount and composition of the synthesis gas in a reactor according to variant 3. With this reactor variant, consisting of an uncooled catalyst bed, an external waste-heat boiler and three cooled catalyst beds with iron catalyst, of which the first cooled catalyst bed is operated in countercurrent flow, and which has three bypasses, an ammonia exit concentration of 28.6% by volume is achieved.

EXAMPLE 2

The second calculated example relates to a reactor with an uncooled catalyst bed, an external waste-heat boiler and three cooled catalyst beds. In the first two cooled catalyst beds, a conventional iron catalyst is used, in the last cooled catalyst bed the highly active ruthenium catalyst. The three cooled beds are operated in co-current flow. The catalyst volumes are 218 $m^3$ of iron catalyst and 70 $m^3$ of ruthenium catalyst. This affords with a synthesis gas amount of 24 533 kmol/h a daily ammonia production of 2000 (metric) tons. This example is carried out at a pressure of about 100 bar. Using the ruthenium catalyst, an ammonia exit concentration of 30.5% by volume can be achieved (cf. table 3).

EXAMPLE 3

Calculation example 3 relates to a reactor arrangement as shown in FIG. 2. The arrangement consists of a reactor with three uncooled beds and three internal indirect heat exchangers and a second reactor with two cooled catalyst beds. The catalyst volume of the iron catalyst is 46 $m^3$. With an entry gas amount of 10 804 kmol/h, an ammonia production of 859 tons per day is achieved. The first exit concentration from the conventional reactor is 21.6% by volume, where an exit concentration in the product gas is increased to 27.4% by volume of ammonia by connection downstream of the second catalyst with the two cooled catalyst beds. The temperature course and the pressure range are furthermore evident from table 4.

The invention claimed is:
1. An apparatus for the synthesis of ammonia from a synthesis gas containing $N_2$ and $H_2$ having at least one first reactor, wherein the apparatus comprises:
    (a) an uncooled catalyst bed unit,
    (b) a heat exchanger apparatus,
    (c) at least two cooled catalyst bed units, wherein each cooled catalyst bed unit comprises a plurality of cooling pipes, wherein the plurality of cooling pipes in each cooled catalyst bed unit is arranged within each cooled catalyst bed unit to provide cooling for the cooled catalyst bed unit,
    (d) a feed apparatus,
    (e) an outlet apparatus,
    (f) a circuit line, and
    (g) a bypass line,
    wherein the circuit line connects the following elements from upstream to downstream:
    (1) the feed apparatus
    (2) the pluralities of cooling pipes, wherein an outlet end of each of the pluralities of cooling pipes is connected to an exit collection apparatus, wherein the exit collection apparatus is connected to either
        (i) an inlet end of the next successive downstream plurality of cooling pipes, or
        (ii) an inlet end of the uncooled catalyst bed unit,
    (3) the uncooled catalyst bed unit,
    (4) the heat exchanger apparatus,
    (5) the at least two cooled catalyst bed units, and
    (6) the outlet apparatus,
    wherein the bypass line is connected upstream to the feed apparatus and downstream to one or more of the exit collection apparatuses of the pluralities of cooling pipes, and wherein the bypass line is arranged in parallel to the circuit line,
    wherein the bypass line is equipped with a control device,
    wherein the control device is functionally connected to a distributor device,
    wherein at least one connection between the bypass line and an exit collection apparatus of a plurality of cooling pipes is made by the distributor device,
    wherein the distributor device controls a feed rate of the synthesis gas from the bypass line to the exit collection apparatus of the plurality of cooling pipes, and wherein the control device is a regulation device and is coupled to a sensor for the recording of a parameter functionally for the regulation of the distributor device, wherein the parameter is an exit temperature of the at least two cooled catalyst bed units, wherein the sensor is located downstream from a cooled catalyst bed unit of the at least two cooled catalyst bed units.

2. The apparatus as claimed in claim 1, wherein a segment of a fluid path for the synthesis gas is provided by the following elements connected by the circuit line in the following order:
(1) the feed apparatus,
(2) the plurality of cooling pipes of the furthest downstream cooled catalyst bed unit, and
(3) the plurality of cooling pipes of the furthest upstream cooled catalyst bed unit,
wherein the furthest upstream cooled catalyst bed unit reacts the synthesis gas before the furthest downstream cooled catalyst bed unit.

3. The apparatus according to claim 1, wherein the uncooled catalyst bed unit is alternatively arranged in
(a) the at least one first reactor, or
(b) a separate reactor.

4. The apparatus according to claim 1, wherein the heat exchanger apparatus is alternatively
(a) one or more of the cooled catalyst bed units, or
(b) arranged in a separate reactor.

5. The apparatus according to claim 4, wherein the separate reactor is a cooled tubular reactor filled with catalyst.

6. The apparatus according to claim 1, wherein at least the furthest downstream cooled catalyst bed unit includes a catalyst with an activity which is at least twice the activity of a conventional iron catalyst,
wherein the furthest downstream cooled catalyst bed unit reacts the synthesis gas after all other cooled catalyst bed units.

7. The apparatus according to claim 1, wherein at least the furthest downstream cooled catalyst bed unit includes a catalyst with an activity which is more than five-fold the activity of a conventional iron catalyst,
wherein the furthest downstream cooled catalyst bed unit reacts the synthesis gas after all other cooled catalyst bed units.

8. The apparatus according to claim 1, wherein at least the furthest downstream cooled catalyst bed unit includes a catalyst with an activity which is more than seven-fold the activity of a conventional iron catalyst,
wherein the furthest downstream cooled catalyst bed unit reacts the synthesis gas after all other cooled catalyst bed units.

9. The apparatus according to claim 1, comprising up to four cooled catalyst bed units.

10. The apparatus according to claim 1, comprising three cooled catalyst bed units.

11. The apparatus according claim 10, wherein a segment of a fluid path for the synthesis gas is provided by the following elements connected by the circuit line in the following order:
(1) the feed apparatus,
(2) the plurality of cooling pipes of the furthest downstream cooled catalyst bed unit, and
(3) the plurality of cooling pipes of the second furthest downstream cooled catalyst bed unit, and
(4) the plurality of cooling pipes of the second furthest upstream cooled catalyst bed unit, and
(5) the plurality of cooling pipes of the furthest upstream cooled catalyst bed unit, wherein the furthest upstream cooled catalyst bed unit reacts the synthesis gas before the second furthest upstream cooled catalyst bed unit, and the second furthest upstream cooled catalyst bed unit reacts the synthesis gas before the second furthest downstream cooled catalyst bed unit and the second furthest downstream cooled catalyst bed unit reacts the synthesis gas before the furthest downstream cooled catalyst bed unit.

12. The apparatus according claim 11, wherein a segment of a fluid path for the synthesis gas is provided by the following elements connected by the circuit line in the following order:
(1) the feed apparatus,
(2) the plurality of cooling pipes of the furthest downstream cooled catalyst bed unit, and
(3) the plurality of cooling pipes of the middle cooled catalyst bed unit, and
(4) the plurality of cooling pipes of the furthest upstream cooled catalyst bed unit, wherein the furthest upstream cooled catalyst bed unit reacts the synthesis gas before the middle cooled catalyst bed unit, and the middle cooled catalyst bed unit reacts the synthesis gas before the furthest downstream cooled catalyst bed unit.

13. A process for the synthesis of ammonia from a synthesis gas containing $N_2$ and $H_2$ in an apparatus having at least one first reactor according to claim 1, comprising the steps
supplying synthesis gas containing $N_2$ and $H_2$ by the feed apparatus to the circuit line,
leading the synthesis gas through the pluralities of cooling pipes,
introducing and allowing the synthesis gas to react in the uncooled catalyst bed unit with formation of a partially reacted synthesis gas, which contains ammonia in a first exit concentration,
leading and cooling of the partially reacted synthesis gas into the heat exchanger apparatus,
leading and allowing the partially reacted synthesis gas to react in the at least two cooled catalyst bed units with formation of a product gas that contains ammonia in a second exit concentration,
leading the product gas out at the outlet apparatus in order to separate off ammonia,
leading back unreacted $N_2$ and $H_2$ from the product gas before the feed apparatus and making available the unreacted $N_2$ and $H_2$ from the product gas and a non-recycled fresh $N_2$ and $H_2$ as the synthesis gas in the circuit line, with simultaneous
leading of a fraction of the synthesis gas through the bypass line in parallel to a remaining fraction of the synthesis gas through the pluralities of cooling pipes.

14. The process as claimed in claim 13, wherein the control device controls by means of the distributor device the fraction of the synthesis gas that is led into the bypass line.

15. The process as claimed in claim 14, wherein the control device records, as the regulating device by means of the functionally coupled sensor, at least one parameter of the process and thus regulates the fraction of the synthesis gas that is led into the bypass line.

16. The process as claimed in claim 15, wherein the parameter is in each case a temperature of the at least two cooled catalyst bed units.

17. The process as claimed in claim 13, wherein the process is carried out at pressures in a range between 30 and 300 bar and at temperatures in a range between 100 and 600° C.

18. The process as claimed in claim 13, wherein a temperature of the synthesis gas before the introduction into the uncooled catalyst bed unit is between 150 and 500° C.

19. The process as claimed in claim 13, wherein the leading of the synthesis gas through the pluralities of cooling pipes and the leading and allowing of the partially reacted synthesis gas to react in the at least two cooled catalyst bed units takes place
in co-current flow,
in countercurrent flow, or
in a combination of co- and countercurrent flow, wherein the flow in the plurality of cooling pipes of the first cooled catalyst bed unit is in countercurrent flow and the flow in the plurality of cooling pipes of the other catalyst bed units is in co-current flow.

20. The process as claimed in claim 13, wherein the leading of the synthesis gas through the pluralities of cooling pipes of the at least two cooled catalyst bed units comprises:
leading the synthesis gas first through the plurality of cooling pipes of the last cooled catalyst bed unit situated downstream, then
leading the synthesis gas through the plurality of cooling pipes of the in each case next catalyst bed unit situated upstream.

21. The process as claimed in claim 13, wherein the leading and cooling of the partially reacted synthesis gas generates high-pressure steam with a pressure of 50 to 140 bar.

22. The process as claimed in claim 13, wherein allowing the partially reacted synthesis gas to react at least in the last cooled catalyst bed unit situated downstream takes place on a catalyst with an activity that is at least twice the activity of a conventional iron catalyst.

23. The process as claimed in claim 13, wherein the first ammonia exit concentration of the partially reacted synthesis gas corresponds to a proportion by volume of 5 to 25%, and where the second ammonia exit concentration of the product gas results in a proportion by volume of more than 30%.

24. An apparatus for the synthesis of ammonia from a synthesis gas containing $N_2$ and $H_2$ having at least one first reactor, wherein the apparatus comprises:
an uncooled catalyst bed unit, a heat exchanger apparatus, at least two cooled catalyst bed units, a feed apparatus, an outlet apparatus, a circuit line, and a bypass line,
wherein each cooled catalyst bed unit comprises a plurality of cooling pipes, wherein the plurality of cooling pipes in each cooled catalyst bed unit is arranged within each cooled catalyst bed unit to provide cooling for the cooled catalyst bed unit, wherein the circuit line connects the following elements from upstream to downstream:
(1) the feed apparatus
(2) the pluralities of cooling pipes, wherein an outlet end of each of the pluralities of cooling pipes is connected to an exit collection apparatus, wherein the exit collection apparatus is connected to either
(i) an inlet end of the next successive downstream plurality of cooling pipes, or
(ii) an inlet end of the uncooled catalyst bed unit,
(3) the uncooled catalyst bed unit,
(4) the heat exchanger apparatus,
(5) the at least two cooled catalyst bed units, and
(6) the outlet apparatus,
wherein the bypass line is arranged in parallel to the circuit line, wherein the bypass line is connected upstream to the feed apparatus and downstream to the exit collection apparatuses of the pluralities of cooling pipes, wherein the connection between the bypass line and the exit collection apparatuses is made by a plurality of distributor devices, wherein the plurality of distributor devices control the feed rate of synthesis gas from the bypass line to the exit collection apparatuses of the pluralities of cooling pipes, and
wherein each cooled catalyst bed unit comprises a sensor that measures a process parameter of the cooled catalyst bed unit, wherein each sensor is connected to a control device that controls the plurality of distributor devices, wherein the control device is configured to independently adjust the flow of synthesis gas from the bypass line for each distributor device based on the process parameters of the cooled catalyst bed units to optimize the synthesis of ammonia in each cooled catalyst bed unit,
wherein the control device is configured to adjust each distributor device independently based on the relative activity of each catalyst in each respective cooled catalyst bed unit, wherein the apparatus contains two different catalysts having different activities.

25. The apparatus according to claim 24, wherein the control device is configured to adjust each distributor device independently based on a change in catalyst activity over time in each respective cooled catalyst bed unit.

26. The process as claimed in claim 13, wherein allowing the partially reacted synthesis gas to react at least in the last cooled catalyst bed unit situated downstream takes place on a catalyst with an activity that is at least five-fold the activity of a conventional iron catalyst.

27. The process as claimed in claim 13, wherein allowing the partially reacted synthesis gas to react at least in the last cooled catalyst bed unit situated downstream takes place on a catalyst with an activity that is at least seven-fold the activity of a conventional iron catalyst.

28. The process as claimed in claim 13, wherein the first ammonia exit concentration of the partially reacted synthesis gas corresponds to a proportion by volume of 5 to 25%, and where the second ammonia exit concentration of the product gas results in a proportion by volume of up to 40%.

* * * * *